(12) United States Patent
Schmid

(10) Patent No.: US 6,823,976 B2
(45) Date of Patent: Nov. 30, 2004

(54) PARKING BRAKE, ESPECIALLY FOR AN AUTOMOTIVE GEARBOX

(75) Inventor: Wolfgang Schmid, Langenargen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/333,009

(22) PCT Filed: Jul. 28, 2001

(86) PCT No.: PCT/EP01/08770
§ 371 (c)(1),
(2), (4) Date: Jan. 13, 2003

(87) PCT Pub. No.: WO02/10619
PCT Pub. Date: Feb. 7, 2002

(65) Prior Publication Data
US 2004/0011609 A1 Jan. 22, 2004

(30) Foreign Application Priority Data
Aug. 2, 2000 (DE) .......................... 100 37 565

(51) Int. Cl.$^7$ .............................................. B60K 41/26
(52) U.S. Cl. ....................................... 192/219.5; 188/31
(58) Field of Search ...................... 188/31, 69; 303/89; 192/219.4, 219.5; 74/411.5, 577.5; 92/24

(56) References Cited

U.S. PATENT DOCUMENTS

| | | | |
|---|---|---|---|
| 2,156,387 A | * | 5/1939 | Goldfinger .................. 292/144 |
| 4,987,968 A | | 1/1991 | Martus et al. ............... 180/272 |
| 6,186,047 B1 | * | 2/2001 | Baruffaldi ..................... 92/24 |
| 6,471,027 B1 | | 10/2002 | Gierer et al. ............. 192/219.5 |

FOREIGN PATENT DOCUMENTS

| | | | |
|---|---|---|---|
| DE | 41 27 991 A1 | 2/1993 | ........... B60K/20/02 |
| DE | 43 22 523 A1 | 1/1995 | ........... B60K/20/02 |
| DE | 198 20 920 A1 | 11/1999 | ........... F16H/63/38 |
| DE | 198 34 156 A1 | 2/2000 | ........... F16H/63/34 |
| DE | 198 58 543 A1 | 6/2000 | ........... F16H/61/12 |
| EP | 0 356 769 A1 | 3/1990 | .............. F16C/1/12 |

* cited by examiner

*Primary Examiner*—Pam Rodriguez
(74) *Attorney, Agent, or Firm*—Davis & Bujold, P.L.L.C.

(57) ABSTRACT

A parking brake especially for an automotive automatic gearbox or an automotive automated manual gearbox. The parking brake comprises a blocking device that blocks or unblocks the gearbox in response to an actuation signal triggered by an actuation device. The blocking device is brought into the blocking position by actuating a spring accumulator (10) and the blocking device is released from the blocking position by either hydraulic or pneumatic pressure while simultaneously pretensioning the spring accumulator (10). The parking brake is further provided with a mechanically actuating locking device (40) for maintaining the blocking device in the non-blocking condition, and with an electromagnet (40) that can be supplied with current and that maintains the locking device (40) in the locking position. The parking brake is further characterized in that the locking device (40) is mechanically actuated by the blocking device when the blocking position is released and is maintained in the locking position by the electromagnet (30) that is supplied with current.

13 Claims, 1 Drawing Sheet

PARKING BRAKE, ESPECIALLY FOR AN AUTOMOTIVE GEARBOX

FIELD OF THE INVENTION

The invention concerns a parking brake, especially for an automatic transmission for a motor vehicle or for an automatized, manual, motor vehicle shift.

BACKGROUND OF THE INVENTION

Normally, with motor vehicles automatic transmissions possess a mechanically acting parking brake apparatus, in which, for example, when in park, a blocking pawl drops into a tooth gap of a parking brake gear. The gear is connected to the output shaft of the transmission and thus to an axle of the vehicle. Mechanical and electrohydraulic systems are known to be used as operative connectors between a parking brake and its regulatory apparatus in the interior of the motor vehicle. Mechanical operative connectors, for instance, comprise encased push/pull cables between a selector lever affixed to the body, an electrohydraulic transmission control placed in the automatic transmission as well as to the parking brake activation apparatus located within the transmission housing. A purely electrical activation connection between the automatic transmission regulating apparatus in the interior of the vehicle and the electrohydraulic transmission control demands, as a condition, the conversion of the electrical signal into the mechanical movement of a pawl to block/unblock the parking brake. Essential advantages of the purely electrically executed actuation between the operative apparatus of the automatic transmission and the electrohydraulic transmission control are found in an acoustic decoupling of the operative apparatus from the input drive string of the motor vehicle and the free choice of the location of the regulating apparatus in the interior of the vehicle.

DE 43 22 523 A1, for instance, describes an electrohydraulic control device for an automatic transmission of a motor vehicle, with an electrically based operative connection between the regulatory apparatus in the interior of the vehicle for the automatic transmission and the electrohydraulic transmission control, wherein the shift stages D, R, and N are effected by the application of pressure to individual shifting members, while the stage P automatically engages upon loss of pressure in all connected shifting members.

This arrangement leads to the fact, that not only in stage P, but also in all shifting stages of the gear-shift lever, upon loss of pressure, the parking brake is actuated. The engagement of the parking brake is executed, in this case, by a spring accumulator, its release being carried out, in contrast, hydraulically. The supply of the necessary pressure for applying the said brake is effected by means of a pressurized oil circulation system, which is inherent in the automatic transmission. In order to be able to release the engaged parking brake in case of failure of the electrical voltage supply, or of a defect in the electronic control device of the automatic transmission, or yet a failure in the transmission oil supply, additionally an emergency disengagement arrangement is provided, by means of which the parking brake can be mechanically released.

DE 41 27 991 C2, for example, likewise discloses a parking brake system for a motor vehicle automatic transmission, with an electrically based operative connection between the regulatory apparatus of the automatic transmission, which is in the vehicle interior and the shiftable parking brake mechanism, wherein the parking brake is engaged by means of a mechanical spring accumulator and released by means of an electrohydraulic transmission control functioning at an elevated pressure. For this purpose, the activation rod, by which the parking brake is caused to engage and/or release, simultaneously serves as a piston in a single action cylinder-piston combination. For the release of the parking brake and for its retention in a released condition, the cylinder is subjected to pressure by a solenoid valve admitting pressurized oil. The hydraulic pressure is, advantageously, supplied directly from the pressurized oil circulation of the automatic transmission, which also furnishes the hydraulic transmission control. In the selected gear shift position P, the solenoid valve is in the closed position and the cylinder is freed of pressure. In the non-pressurized stance, the cylinder pushes the parking brake into the engaged position. The force for this action of the cylinder is supplied by the spring force of the spring accumulator. In one embodiment, the proposal is to provide an elevated pressure reservoir tank with a check valve, in order to hold the parking brake disengaged for a specified time if the motor stalls and pump pressure fails.

Finally, the generic DE 198 34 156 A1 discloses a parking brake system for an automatic transmission in a motor vehicle, wherein the parking brake pawl, as a result of sliding induced by a spring accumulator, falls into its restraining place and can be freed by means of hydraulic pressure, which is supplied by the oil circulatory system of the automatic transmission. At the same time the spring accumulator is pretensioned. For the prevention of an involuntary engagement of the parking brake upon loss of pressure, a hydraulic parking brake activation device provides a mechanical detent by one or more balls. The ball detent action is activated by an electromagnet, in which an activating rod is placed in a linearly sliding motion as a result of energization of the electromagnet. When this occurs, the balls are brought into the locking position by the activating rod which has a diameter equivalent to that of the ball. As long as the electromagnet is energized, just so long is the parking brake held in its non-braking position. A blocking mechanism which can carry out this operation requires, counter to the available opposing force of the spring accumulator, only a relatively small activation force to effect a linear motion in the activation rod which must be brought away from the electromagnet. The holding force of the ball detents, which likewise must be brought away from the electromagnet, is very small. The design criteria for the electro magnet are, the required pulling force for the activation of the braking mechanism, the path of the activation and the necessary holding power. In the case of a locking mechanism in accord with DE 198 34 156 A1, the activation path measures about 3 mm. Since it is known that the attraction force of an electro magnet decreases rapidly as separation therefrom increases, the result is that the electromagnet, with a relatively large activation path of the locking mechanism, must have correspondingly large dimensions. As a result of this, mounting space problems can arise and an unwanted large power must be provided to energize the electromagnet, which must be supplied, as a rule, by the electronic transmission control.

Thus, the present invention has the purpose of improving an electrohydraulically controlled parking brake, in accord with the generic state of the technology, in regard to a minimizing of the necessarily consumed electrical capacity and a reduction of the mounted space of the parking brake activation apparatus.

In accord with the invention, this purpose is achieved with a parking brake, which possesses the features of the principal claim. Further advantageous embodiments of the invention are evident in the subordinate claims.

SUMMARY OF THE INVENTION

The invention proceeds from the concept of a known parking brake system, in which a parking brake locking pawl for the blocking of a transmission is hydraulically disengaged, wherein, the required hydraulic energy for this action is advantageously supplied by the electrohydraulic control unit of the transmission. An advantageous activation element of the releasing arrangement of the parking brake is a hydraulically actuated cylinder, which is in mechanical connection with the parking pawl. Simultaneously, with the withdrawal of the parking pawl from its engagement, a spring accumulator is pretensioned, by means of the spring force of which, the parking brake, upon a depressured positioning of the hydraulic release element, engages. The now withdrawn parking brake lockup pawl is, in a known manner, held in its withdrawn position by a mechanical latch arrangement actuated by the electromagnet, which is energized in this situation.

In accord with the invention, the proposal is now made for mechanical activation of the locking of the parking brake blocking system to effect the holding of the parking brake in its non-braked condition. The locking, in this plan, is to be actuated by the blocking apparatus of the parking brake (the pawl) by the release of the same from its blocking position. An energized electromagnet holds the locking apparatus in its locking position for the retention of the parking brake in the non-braking condition. The blocking apparatus, especially the pawl which blocks the parking brake, also possesses a mechanical operative-connection to the locking apparatus, for instance, by means of a known interconnection disk of the parking brake system.

In the case of a released parking brake, the principle of the mechanical restraint of the parking brake blocking apparatus, in connection with the electromagnet for the holding of locking apparatus in its locking position, so acts in a known manner, that the electromagnet does not need to bring a full counter-force against overwhelming forces from the spring accumulator intended for the parking brake block, but need only create the restraining forces of the blocking element. The invented mechanical tension of the locking apparatus so acts, that the electromagnet does not have to generate any actuation forces, and accordingly, has only a purely holding function. In this way, the electromagnet need be designed to act constructively only on the holding forces. Consequently, the electrical capacity data and the installation size of said electromagnet is small.

In one embodiment of the invention, the proposal is made, to activate the locking apparatus simultaneously by hydraulic and electromagnetic means for the holding the parking brake in the non-braking state. Using as a starting point, the generic state of the technology disclosed by DE 198 34 156 A1, there becomes available in this way, a mechanical support for the pull of the electromagnet magnets, wherein the mechanical forces to be exerted for the activation of the locking apparatus are reduced in proportion to the path of the activation, in order to reduce the electromagnetic force. Correspondingly, the required electrical capacity as well as the installation space of the electrical equipment become less for the energization of the electromagnet.

A preferred, known principle of the mechanical locking of the parking brake has been disclosed by DE 198 34 156 A1. This design calls for a detent to be established by means of balls, for which a specially designed activation rod is linearly displaced by an energized electromagnet to provide actuation and holding functions. In this arrangement, the balls, by means of a conically shaped section of said rod, fix the said rod in a set position. In this locked position, the balls create a form-fit between, first, the actuating element of the parking brake apparatus, the actuating element possibly being the piston of a hydraulically or pneumatically operating cylinder and, second, an immovable part of the spring accumulator.

In this manner the activating element of the parking brake/release apparatus is mechanically blocked, as long as the actuating rod of the locking apparatus is held in its fixed position by the electromagnet.

BRIEF DESCRIPTION OF THE DRAWING

The invention will now be described, by way of example, with reference to the accompanying drawings in which.

DETAILED DESCRIPTION OF THE INVENTION

Figure 1:
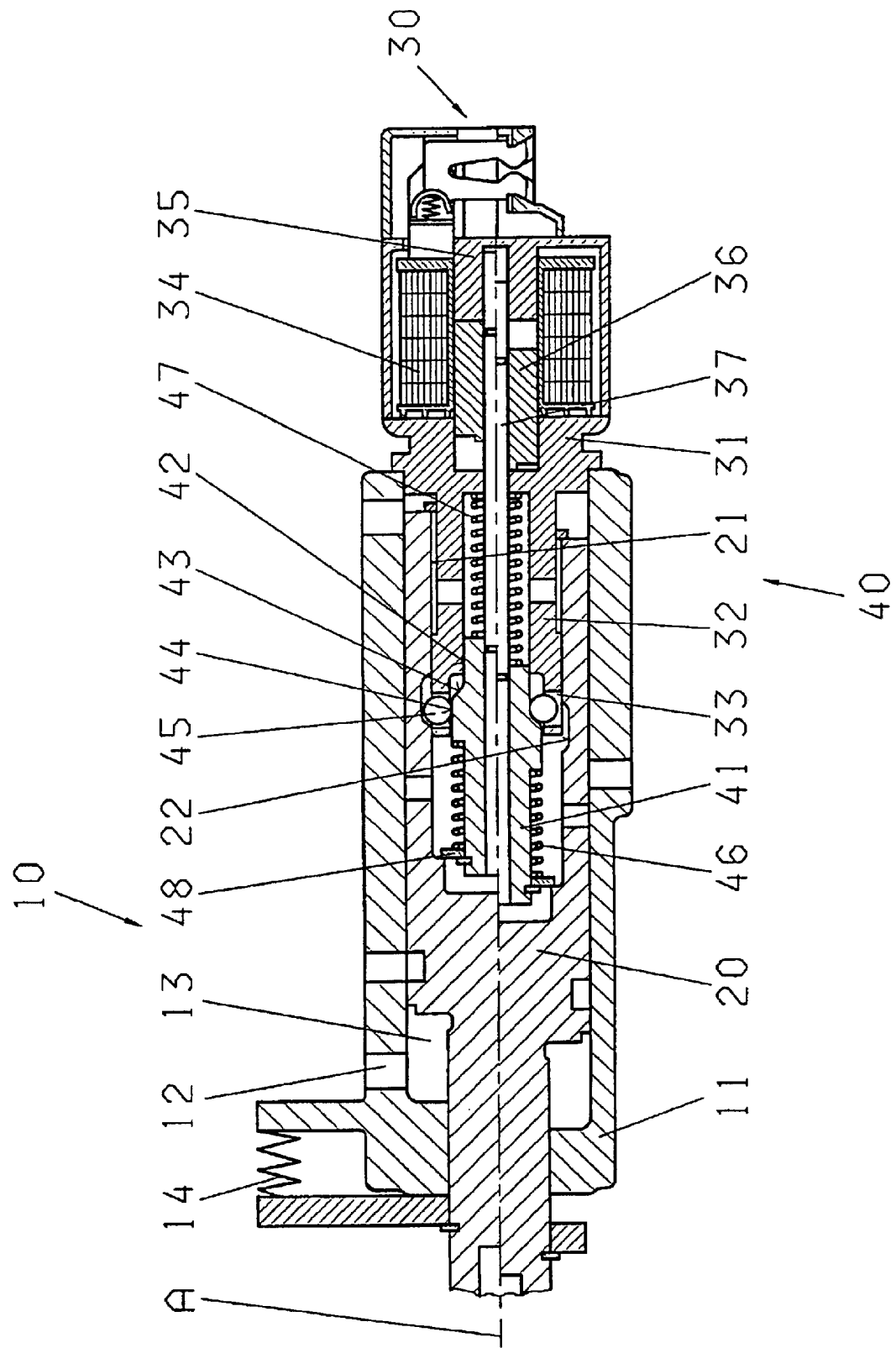
FIG. 1 shows a spring accumulator for a hydroelectrically activated parking brake.

The single illustration shows a spring accumulator 10 for a hydroelectrically activated parking brake, especially for a motor vehicle with an automatic or automated manual shifting transmission. Above the axial centerline A, the spring accumulator 10 is shown in the locked position with a released parking brake. Below the centerline A the spring accumulator is shown in the corresponding spring-expanded condition while the parking brake is engaged. In an immovable part 11 of the spring accumulator 10, is located an axially movable piston 20, which is mechanically bound to a blocking apparatus of the parking brake which is described briefly as follows: For example, the blocking apparatus can be designed as a blocking pawl, which can interpose itself in a gap in a toothed wheel of the parking brake, which said toothed wheel acts upon a take-off drive shaft of the transmission. The piston 20 can be subjected to pressure by means of a control port 12 which admits a pressurized fluid into a pressure chamber 13. In a known way, an exposure to hydraulic or pneumatic pressure causes such a reaction, that the piston 20 travels axially and thereby a blocking apparatus of the parking brake, counter to the spring force of a parking brake spring 14, is displaced from its blocking position. At the same time, by the axial movement of the piston 20, the parking brake spring 14 is compressed, whereby, by means of its spring force, the blocking apparatus of the parking brake is again brought into a braking position, when the pressure in chamber 13 is relieved.

On an end face of the immovable part 11 of the spring accumulator 10 is affixed electrically chargeable electromagnets 30. The electromagnets comprise, essentially, a housing 31 with a tubular shaped housing elongation 32, an electrically chargeable coil 34, a holding magnet 35, an axial displaceable armature 36 and an armature rod 37 affixed to the displaceable armature.

The locking apparatus is designated as 40, which, in accord with the invention, is mechanically brought into its locking position and held in this position by the energized electromagnet 30. A detent ball 45, more advantageously, a plurality thereof, is placed as a radially movable element in a containing recess 33 of the housing elongation 32 of the electromagnet 30. Obviously, locking devices of different geometry can be employed for this service.

The locking apparatus possesses a spreader cone 41, which, is bound to the armature rod 36 on that end of the armature remote from the electromagnets 30. The spreader cone 41 has three functional surfaces, namely 42, 43, and 44, which are in operational connection with the one or more detent balls 45. The spreader cone 41 is axially moveable between an activation spring 46, which abuts a disk 48 affixed to the piston 20, and a repositioning, prestressable spring 47 which abuts against the immovable part 11 of the spring accumulator 10. This configuration enables a mechanical tolerance compensation between the mechanical actuation and the electromagnetic holding apparatus of the locking apparatus 40.

If the parking brake is engaged, then the piston 20 finds itself in an advanced position, as is depicted in the Figure below the center line A. The actuation spring 46 and the repositioning spring 47 of the spreader cone have expended their energy. In another embodiment form, the actuation spring 46 and the repositioning spring 47 can remain slightly prestressed. The detent balls 45 find themselves in the area of the first, cylindrical designed function surface 42 of the spreader cone 41. Should, at this point, the parking brake be released, then the pressure chamber 13 will be filled and the piston 20 slides axially in the direction of the electromagnet 30 until coming to a stop in the end position, as this is shown in the FIGURE above the centerline A. For a compensation of the component clearances, in the embodiment example there is provided, advantageously, a small axial clearance between the piston 20 and the spreader cone 41. The piston 20 must also, at the start of the release of the parking brake, first travel through a short space before it pushes the spreader cone 41 and therewith the armature 36 in the direction of the holding, permanent magnet 35. In another embodiment example, provision can be made, that a movement of the piston 20 in the direction of the electromagnet 30 has the result that it immediately triggers the invented mechanical actuation of the locking mechanism 40.

Upon the release of the parking brake, the locking mechanism 40 is mechanically actuated by the now pressure loaded piston 20. The force transmission is done, in this case, by the piston 20 pressing against the disk 48 on the actuation spring 46. This pressing force is counter to an opposing spring force on one surface of the spreader cone 41, which spring force originates from the repositioning spring 47 which abuts against the immovable part 11 of the spring accumulator 10. The spreader cone 41 is accordingly pushed against the force of the actuation spring 46 and against the force of the repositioning spring 47 and caused to move axially in the direction of the electromagnet 30. As this is being carried out, the detent balls 45 are forced outward by the second, conically shaped functional surface 43 of the spreader cone 41 and into their radial recess 33 of the electromagnet housing extension 32. In this position the detent balls also engage within a piston recess 22. The piston recess 22 is advantageously so dimensioned, that a small axial movement of the said detent balls 45 within is possible. This movement, for instance, is 2 mm. Subsequently the detent balls lie in the zone of the third, cylindrically machined, functional surface 44 of the spreader cone 41, on a cylindrical surface of greater diameter than that of the functional surface 42, and thus also in the piston recess 22. By the radial fixation of the detent balls 45 in the housing extension 32 of the electromagnet 30, there is created a form-fit between the piston 20 and the immovable part 11 of the spring accumulator 10, as well as with the electromagnet housing 31 which is connected thereto.

In another embodiment example of the spreader cone 41, provision can be made, that the functional surface 44 also is designed with a slight conical taper, with the smaller diameter directed toward the functional surface 43. In an advantageous manner, by this arrangement, the releasing of the locking apparatus 40 can be made with greater ease.

In the final position, the armature 36, which is firmly connected to the spreader cone 41, lies against the holding magnet 35. A customary travel path of the piston 20, from the point of the detent block position of the parking brake to the end position of the armature, runs about 3 to 5 mm.

The electromagnet 30 now carries out its holding function for the locking apparatus 40. As long as the coil 34 is energized, the induced electromagnetic force holds the armature 36 on the holding magnet 35 against the oppositely directed retroaction of the spreader cone 41, which retroaction force originates in the repositioning spring 47 and the actuation spring 46. The required holding force is small with the consequence that the required electrical energy for the maintenance of the holding function is correspondingly small. The electromagnet 30, designed on the basis of a purely holding function advantageously requires little construction space.

In the embodiment example of the invention, in an advantageous manner, for the compensation of tolerances, a sufficiently small travel path of the piston 20 is made possible beyond the end of the armature 36 into the holding magnet 35, whereby the actuation spring 46 is slightly over compressed. Since the resulting spring force from the said over compressing of the actuation spring 46 works against the spring force of the repositioning spring 47, the required holding force of the electromagnet 30, i.e. the holding magnet 35 is further reduced, as long as the piston 20 is kept under pressure.

If now, the parking brake is actuated, that is, the detent apparatus of the parking brake is brought into the braking position, then the pressure chamber 13 is relieved in a known manner. As a result of the spring force of the parking brake spring 14, the piston slides so far back, that is away from the electromagnet 30, until it is arrested by the detent balls 45 which still lie in the piston recess 22. Normally, this travel runs some 2 to 3 mm, dependent upon the design geometry. In this position of the piston 20, the actuation spring 46 is advantageously relaxed. If one now disconnects the still electrically energized electromagnet 30, then the spring force of the repositioning spring 47 presses the spreader cone back, the spring force of the parking brake spring 14 slides the piston 20 further, whereby the detent balls 45 are moved along the second, conical, functional surface 43 once again onto the smaller diameter of the first, cylindrical functional surface 42 of the spreader cone, and the parking brake is set in its braking position.

In the presented embodiment of the invention, the components of the locking apparatus 40 are nested advantageously within one another to conserve installation length in a longitudinal boring 21 of the piston 20. The tubular shaped housing extension 32 of the electromagnet 30 protrudes likewise into the longitudinal boring 21 of the piston and takes over the task of the guidance of the armature rod 37 and the spreader cone 41, as well as the reception and the radial guidance of the detent balls 45. Obviously, also other spatial component arrangements with the same functional action are applicable, wherein the locking apparatus 40 is placed at least partially in the longitudinal boring 21 of the piston 20.

The necessary hydraulic or pneumatic energy for the release of the parking brake and for the prestressing of the spring accumulator 10 as well for the mechanical actuation of the locking apparatus 40 can advantageously be drawn from available hydraulic or pneumatic transmission control, which utilities are normally available with an automatic transmission or automated manual shifting transmission. However, pressure supply devices, designed specially made for the parking brake actuation, can be installed.

The installation of the invented parking brake is not limited to the automatic transmission or to the automated manual shift transmission for motor vehicles. This system can be employed for other drives and power take-off components, wherein, at least one rotating or linearly slidable drive element is to be held still by a parking brake, by means of an electrohydraulic or an electropneumatic operational connection between a control element and a lockup apparatus of the parking brake. Application examples, wherein a rotatable drive element can be stopped by a parking brake include motors, transmissions, drive heads, axles and axle drives for vehicles of all descriptions, cable car runways, conveyor apparatuses, conveyor belts, cable winders, machine tools and the like. Applications, in which a linear acting drive element possesses a parking brake, are to be found in the realm of automation.

Reference Numbers and Associated Components
10 Spring accumulator
11 Immovable part of the spring accumulator
12 Control port (hydraulic, pneumatic)
13 Pressure chamber
14 Parking brake spring
20 Piston
21 Longitudinal boring for piston
22 Piston recess
30 Electromagnet
31 Housing for the electromagnet
32 Tubular housing elongation
33 Housing recess (for detent balls)
34 Coil, energizable
35 Holding magnet
36 Armature
37 Armature rod
40 Locking apparatus
41 Spreader cone
42 First cylindrical functional surface
43 Second conical functional surface
44 Third cylindrical functional surface
45 Detent ball(s)
46 Actuation spring
47 Repositioning spring
48 Disk (on piston, forms abutment for actuation spring)
"A" Axial center line

What is claimed is:

1. A parking brake for a drive, the parking brake comprising:
    a blocking apparatus for receiving actuating signals from a regulating device for control of the drive, the blocking apparatus, upon activation of a spring accumulator (10), is brought into a blocking position from which, by one of hydraulic and pneumatic pressure, the blocking apparatus is released while simultaneously prestressing the spring accumulator (10);
    a mechanical acting locking apparatus (40) for holding of the blocking apparatus in an unblocked condition; and
    an energizable electromagnet (30) for holding of a locking apparatus (40) in a locking condition, the locking apparatus (40) is mechanically activated by the blocking apparatus upon release of the blocking position and the locking apparatus (40) is retained in the locked position by the energized electromagnet (30);
    the locking apparatus (40) comprises a spreader cone (41), which is linearly movable between an actuation spring (46), which abuts axially against a hydraulically or pneumatically controlled piston (20), which said piston is designed to release the parking brake and a repositioning spring (47) which axially abuts on an immovable part (11) of the spring accumulator (10),
    the spreader cone (41) comprises a first cylindrical surface (42) bordering a second conical surface (43) and further demarked by a third, at least approximately cylindrical surface (44) which third surface has a greater diameter than the first surface (42),
    the spreader cone (41) is securely bound to an armature (36) of the electromagnet (30),
    the locking apparatus (40) has at least one radially movable detent means for the holding of the blocking apparatus in the unblocked condition,
    the piston (20), upon release of the brake apparatus from a braked condition, pushes the spreader cone (41) mechanically toward a holding magnet (35) of the electromagnet (30), whereby the spreader cone (41), via the three surfaces (42, 43, 44) causes the detent (45) to move radially outward into a piston recess (22) into a locking position, in such a manner that a shape-fit is created between the piston (20) and an immovable part (11) of the spring accumulator (10).

2. The parking brake according to claim 1, wherein the first surface (42) of the spreader cone (41) is cylindrical and has a smaller diameter than a joining section of the conical second surface (43), and the third surface (44) of the spreader cone (41) is cylindrical.

3. A parking brake for a motor vehicle transmission, the parking brake comprising:
    a blocking apparatus for receiving an actuating signal from a regulating device to control operation of the parking brake; the blocking apparatus, upon activation of a spring accumulator (10), being brought into a blocking position for engaging the parking brake; the blocking apparatus being movable from the blocking position to an unblocked position by one of hydraulic and pneumatic pressure, and, upon moving the blocking apparatus from the blocking position to the unblocked position, simultaneously prestressing the spring accumulator (10);
    a mechanical locking apparatus (40) for holding the blocking apparatus in the unblocked position; and
    an energizable electromagnet (30) for holding the locking apparatus (40) in a locking condition which maintains the blocking apparatus in the unblocked position, the locking apparatus (40) is mechanically activated by movement of the blocking apparatus from the blocking position to the unblocked position, and the locking apparatus (40) being retained in the locked position by the energized electromagnet (30).

4. The parking brake according to claim 3, wherein the locking apparatus (40), when in the locking condition, holds the spring accumulator (10) regardless of whether pressure is supplied to the blocking apparatus, and the parking brake remains in an disengaged position until the electromagnet (30) is de-energized.

5. The parking brake according to claim 3, wherein, upon release of the blocking apparatus from the blocking position, the locking apparatus (40) is simultaneously activated, and thereafter the locking apparatus (40) is electromagnetically activated by the energization of the electromagnet (30) for maintaining the locked condition of the locking apparatus (40) until the electromagnet is de-energized.

6. The parking brake according to claim 3, wherein the locking apparatus (40) has a mechanically acting tolerance balance which compensates for tolerance of components providing for mechanical activation and for the electromagnetic holding of the locking apparatus (40).

7. The parking brake according to claim 3, wherein the locking apparatus (40) comprises a spreader cone (41) which is linearly movable by a first actuation spring (46), which abuts axially against a control piston (20) which releases the parking brake, and by second repositioning spring (47) which axially abuts against an immovable part (11) of the spring accumulator (10);

the spreader cone (41) comprises a first surface (42) bordering a conical second surface (43) and a third surface (44), and the third surface has a greater diameter than the first surface (42);

the spreader cone (41) is secured to an armature (36) of the electromagnet (30);

the locking apparatus (40) has at least one radially movable detent (45) for holding the blocking apparatus in the unblocked position;

the piston (20), upon release of the parking brake from an engaged condition, mechanically biases the spreader cone (41) toward the electromagnet (30) so that the armature (36) is located adjacent a holding magnet (35) of the electromagnet (30), whereby the first, the second and the third surfaces (42, 43, 44) of the spreader cone (41) causes the detent (45) to move radially outward into a piston recess (22) into a locking position so that a shape-fit is created between the piston (20) and an immovable part (11) of the spring accumulator (10).

8. The parking brake according to claim 7, wherein the first surface (42) of the spreader cone (41) is cylindrical and has a smaller diameter than a joining section of the conical second surface (43), and the third surface (44) of the spreader cone (41) is cylindrical.

9. The parking brake according to claim 7, wherein the piston (20), upon the release of the blocking apparatus from its blocked condition, travels a greater axial distance than does the spreader cone (41) when moving toward the electromagnet (30).

10. The parking brake according to claim 3, wherein the locking apparatus (40) is accommodated within a longitudinal boring (21) of the piston (20).

11. The parking brake according to claim 3, wherein the electromagnet (30), during the mechanical actuation of the locking apparatus (40), is electrically energized.

12. The parking brake according to claim 3, wherein the locking apparatus (40) comprises a spreader cone (41) which is linearly movable by a first actuation spring (46), which abuts axially against a control piston (20) which releases the parking brake, and by second repositioning spring (47) which axially abuts against an immovable part (11) of the spring accumulator (10).

13. The parking brake according to claim 12, wherein the spreader cone (41) is secured to an armature (36) of the electromagnet (30) and the armature (36) is at least partially received by a holding magnet (35) of the electromagnet (30).

* * * * *